US010661909B2

(12) United States Patent
Murphy et al.

(10) Patent No.: US 10,661,909 B2
(45) Date of Patent: May 26, 2020

(54) AIRBAG DEPLOYABLE DATA RECORDER FOR AIRCRAFT

(71) Applicant: The Boeing Company, Chicago, IL (US)

(72) Inventors: Timothy A. Murphy, Mukilteo, WA (US); Charles Otis Adler, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 15/909,075

(22) Filed: Mar. 1, 2018

(65) Prior Publication Data
US 2019/0270523 A1    Sep. 5, 2019

(51) Int. Cl.
*B64D 25/20*    (2006.01)
*G07C 5/08*    (2006.01)
*B64D 45/00*    (2006.01)

(52) U.S. Cl.
CPC .......... *B64D 25/20* (2013.01); *B64D 45/00* (2013.01); *G07C 5/085* (2013.01); *B64D 2045/0065* (2013.01)

(58) Field of Classification Search
CPC .............. B64D 25/20; B64D 45/00; B64D 2045/0065; G07C 5/085
USPC ....................................................... 701/33.4
See application file for complete search history.

(56) References Cited

U.S. PATENT DOCUMENTS

| 8,493,715 B1 * | 7/2013 | Angelucci .............. B64D 45/00 244/1 R |
|---|---|---|
| D701,207 S | 3/2014 | Van den Heuvel et al. |
| 8,706,357 B1 | 4/2014 | van den Heuvel et al. |
| 8,880,283 B2 | 11/2014 | Kaufmann et al. |
| 9,187,183 B2 | 11/2015 | Argillier et al. |
| 9,296,489 B2 | 3/2016 | van den Heuvel et al. |
| 9,452,844 B1 | 9/2016 | Ye et al. |
| 9,738,398 B1 | 8/2017 | Wang et al. |
| 10,002,519 B2 | 6/2018 | Bekanich |
| 2011/0194629 A1 | 8/2011 | Bekanich |
| 2016/0176538 A1 | 6/2016 | Bekanich |
| 2017/0106997 A1 | 4/2017 | Bekanich |
| 2017/0155763 A1 | 6/2017 | Bekanich |
| 2018/0240324 A1 | 8/2018 | Bekanich |
| 2018/0247519 A1 | 8/2018 | Bekanich |

FOREIGN PATENT DOCUMENTS

WO    WO2002031709 A1 *    4/2002    ............. G06F 17/40

OTHER PUBLICATIONS

Reid, "Ejectable, floating 'black box' to be installed on long range Airbus planes," Paris Airshow 2017, CNBC, LLC, Jun. 21, 2017, 4 pages.

* cited by examiner

*Primary Examiner* — Anthony R Jimenez
(74) *Attorney, Agent, or Firm* — Yee & Associates, P.C.

(57) ABSTRACT

A method and an apparatus for deploying flight data from an aircraft. A bag is stored in a deflated state on the aircraft. The flight data is stored on a memory device coupled to the bag. The bag is inflated from the deflated state to the inflated state in response to a pressure level greater than a threshold pressure level to deploy the bag with the memory device coupled thereto from the aircraft.

20 Claims, 9 Drawing Sheets

AIRBAG DEPLOYABLE DATA RECORDER FOR AIRCRAFT

BACKGROUND INFORMATION

1. Field

The present disclosure relates generally to systems and methods for recording aircraft flight data. More particularly, the present disclosure relates to a system and a method for automatically deploying recoverable recorded flight data from an aircraft that lands in water.

2. Background

A flight recorder is an electronic recording device placed in an aircraft to record information for the purpose of facilitating the investigation of aviation accidents and incidents. A flight data recorder, FDR, and a cockpit voice recorder, CVR, are examples of flight recorders. A flight data recorder may be employed to record data sent to and received from various electronic systems on the aircraft. A cockpit voice recorder may record conversation and other sounds in the aircraft cockpit as well as radio communication between personnel in the cockpit and others. A flight data recorder and a cockpit voice recorder may be implemented as separate devices on an aircraft. Alternatively, a flight data recorder and a cockpit voice recorder may be combined in a single unit on an aircraft. Flight recorders are designed to resist the conditions most likely to be encountered in a severe aircraft accident.

Timely recovery of data from flight recorders, following an aircraft accident, is desirable so as to facilitate accident investigation activities that may determine whether it is safe to continue operation of a particular aircraft type. A flight recorder may be colored bright yellow or orange with reflective surfaces or in another appropriate manner to facilitate recovery of the flight recorder from an aircraft accident site. A flight recorder may be equipped with an underwater locator beacon that is automatically activated in the event of an accident and will assist in recovery of the flight recorder from an aircraft that is submerged in water. Nevertheless, aircraft accidents that occur in remote oceanic areas may present significant challenges to accident investigators due to the difficulty of retrieving flight recorders from aircraft at the bottom of the ocean.

An automatically deployable flight recorder, ADFR, is a flight recorder that is designed to separate from an aircraft just before or just after the aircraft crashes. For example, an automatically deployable flight recorder may be mounted in a recessed space on an aircraft such that a surface of the automatically deployable flight recorder is flush with an outer surface of the aircraft. When the aircraft crashes, the automatically deployable flight recorder may be released from the recessed space on the aircraft. Airflow around the aircraft then causes the automatically deployable flight recorder to separate from the aircraft.

An automatically deployable flight recorder may include a radio transmitter. The radio transmitter may be activated to transmit a radio signal after the automatically deployable flight recorder separates from the aircraft to allow the automatically deployable flight recorder to be more easily located.

An automatically deployable flight recorder may be configured to float. In this case, an automatically deployable flight recorder that is deployed from an aircraft that crashes in the water may float on the surface of the water as the transmitter on the automatically deployable flight recorder continues to transmit.

Automatically deployable flight recorders have been used extensively on military aircraft. However, there may be limitations associated with using automatically deployable flight recorders. In particular, there may be various limitations associated with using automatically deployable flight recorders in commercial aviation.

Therefore, there may be a need for a method and an apparatus that take into account at least some of the issues discussed above, as well as other possible issues.

SUMMARY

In one illustrative embodiment, an apparatus comprises a bag that is configured to be inflated from a deflated state to an inflated state, a memory device coupled to the bag, an inflation device, and a pressure switch. The memory device is configured to have flight data from an aircraft stored thereon. The inflation device is configured to inflate the bag from the deflated state to the inflated state. The pressure switch is configured to activate the inflation device to inflate the bag from the deflated state to the inflated state in response to a pressure level greater than a threshold pressure level.

In another illustrative embodiment, a flight data deployment system comprises a plurality of airbag deployable data recorder systems on an aircraft. Each of the plurality of airbag deployable data recorder systems is located at a different location on the aircraft and comprises a bag that is configured to be inflated from a deflated state to an inflated state, a memory device coupled to the bag, an inflation device, and a pressure switch. Each memory device is configured to have the flight data from the aircraft stored thereon. Each inflation device is configured to inflate a corresponding bag from the deflated state to the inflated state. Each pressure switch is configured to activate a corresponding inflation device to inflate the corresponding bag from the deflated state to the inflated state in response to a pressure level greater than a threshold pressure level.

In another illustrative embodiment, a method of deploying flight data from an aircraft comprises storing a bag in a deflated state on the aircraft. Flight data is stored on a memory device coupled to the bag. The bag is inflated from the deflated state to an inflated state in response to a pressure level greater than a threshold pressure level to deploy the bag with the memory device coupled thereto from the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that use of conventional automatically deployable flight recorders in a commercial aviation context may raise safety concerns due to the potential for inadvertent deployments of the ADFR which could result in damage or injuries to property and people on the ground.

Illustrative embodiments provide a new type of deployable flight recorder which is designed specifically to overcome some of the limitations and safety concerns associated with conventional ADFRs. In contrast to conventional ADFRs, an airbag deployable data recorder is lighter in weight, and it is virtually impossible for an airbag deployable data recorder in accordance with an illustrative embodiment to deploy inadvertently.

An airbag deployable data recorder in accordance with an illustrative embodiment is configured to deploy only when an aircraft lands in water and becomes submerged. An airbag deployable data recorder in accordance with an illustrative embodiment may be a passive device in which there is no requirement for a transmitter or battery to power transmissions after deployment. However, in accordance with an alternative embodiment, the addition of a lightweight location beacon transmitter may be practical and desirable under some circumstances. Illustrative embodiments described herein may be minimal designs and integration of additional features are possible.

Figure 1:
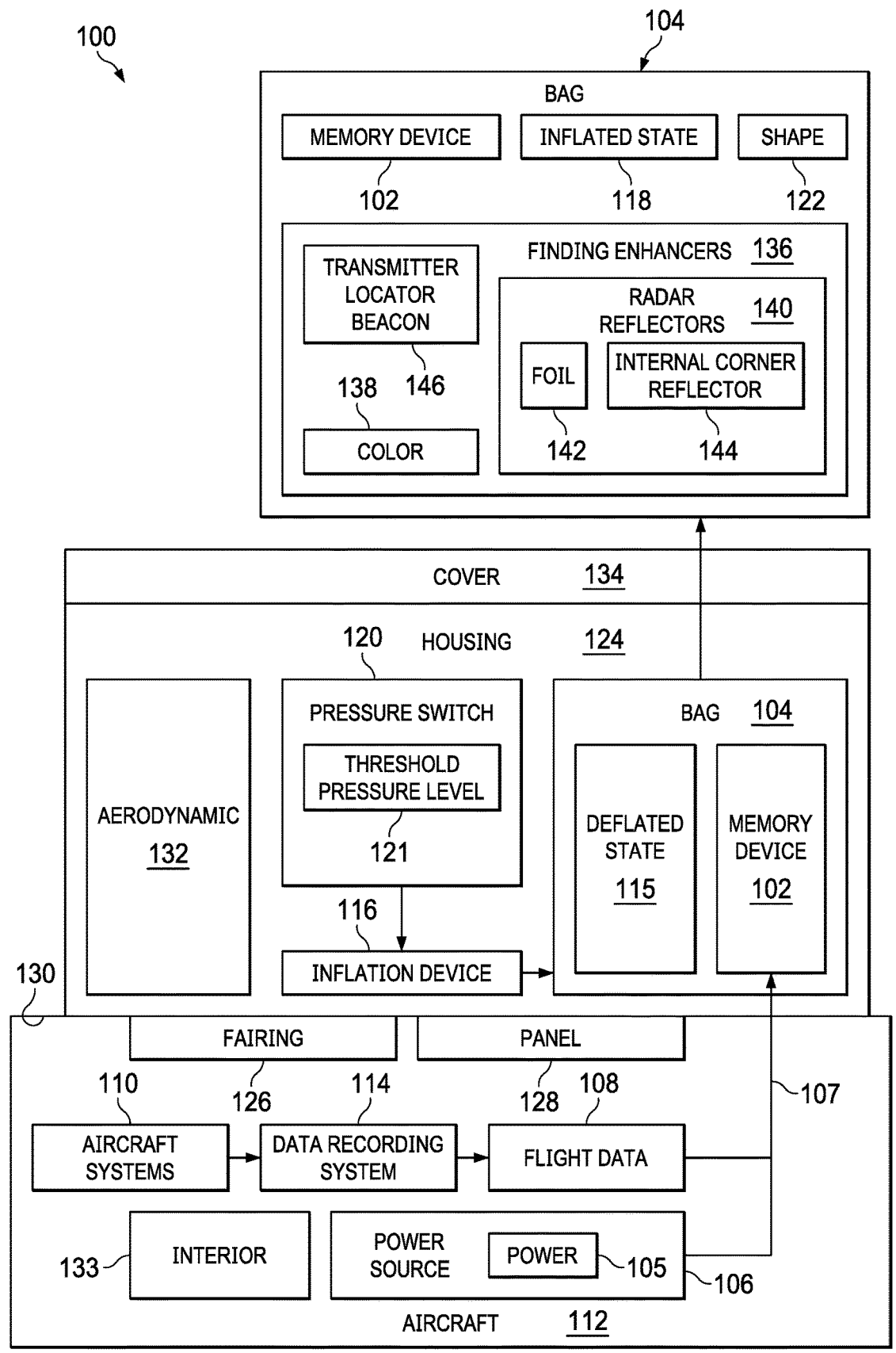
FIG. 1 is an illustration of a block diagram of an airbag deployable data recorder in accordance with an illustrative embodiment.

Turning to FIG. 1, an illustration of a block diagram of an airbag deployable data recorder is depicted in accordance with an illustrative embodiment. Airbag deployable data recorder 100 may comprise memory device 102 and bag 104.

Airbag deployable data recorder 100 is configured to have flight data 108 from aircraft 112 stored thereon while aircraft 112 is in flight. Airbag deployable data recorder 100 is configured to deploy flight data 108 stored thereon from aircraft 112 in the event of an accident involving aircraft 112 so that flight data 108 may be recovered in a timely manner for accident investigation purposes or any other appropriate purpose or combination of purposes.

Aircraft 112 may be any appropriate type of aircraft that may be configured to perform any appropriate operation or mission. For example, without limitation, aircraft 112 may be a commercial passenger aircraft, a cargo aircraft, a military aircraft, a personal aviation aircraft or any other appropriate type of aircraft. Aircraft 112 may be a fixed wing aircraft, a rotary wing aircraft, or a lighter-than-air aircraft. Aircraft 112 may be a manned aircraft or an unmanned aircraft. Any type of aircraft that may perform missions that entail a risk of an unintended landing in water may potentially benefit from use of an airbag deployable data recorder in accordance with an illustrative embodiment.

Memory device 102 may be a solid-state memory device. For example, memory device 102 may be a small chip. All necessary memory and ancillary management circuitry, such as processors, interface controllers, and the like, may be integrated into a single package. Alternatively, memory device 102 may be implemented using several individual components integrated into a small lightweight self-contained package.

Memory device 102 may be provided with power 105 from any appropriate power source 106 via power line 107. For example, without limitation, power line 107 may comprise a two-wire connection or any other appropriate connection for providing power 105 to memory device 102.

In accordance with an illustrative embodiment, a bit stream of flight data 108 may be transmitted to memory device 102 via power line 107. This data transmission may be achieved in any appropriate manner using known communications over power line, COPL, technology as known in the art.

Memory device 102 may record flight data 108 in a first-in-first-out continuous manner. For example, without limitation, flight data 108 stored in memory device 102 may continuously over-write itself in a recirculating buffer such flight data 108 generated by aircraft systems 110 on aircraft 112 over any appropriate arbitrary period of time, such as the last 30 to 40 hours or more, may be stored on memory device 102. The amount of storage on memory device 102 may be any appropriate amount as desired.

The stream of flight data 108 may be provided by data recording system 114 on aircraft 112. Data recording system 114 may be a conventional flight data recorder or other device that has access to all of the data from aircraft systems 110 that is being fed to conventional flight recorders on aircraft 112. Such data collection and formatting devices are common in current aircraft designs. Flight data 108 stored on memory device 102 may thus include all the data being recorded by the flight data recorder and cockpit voice recorders as well as any other desired data from aircraft systems 110.

Bag 104 may be made of a light but strong material, similar to airbags used in automobiles. Inflation device 116 is configured to inflate bag 104 from deflated state 115 to inflated state 118 when inflation device 116 is activated. Inflation device 116 may be configured to inflate bag 104 in any appropriate manner. For example, without limitation, a reaction of sodium azide, $NaN_3$, with potassium nitrate, $KNO_3$, may be used to produce nitrogen gas that may be used to inflate bag 104 very quickly when the substance is ignited electronically.

In accordance with an illustrative embodiment, inflation device 116 may be activated to inflate bag 104 in response to activation of pressure switch 120. Pressure switch 120 may be configured to activate when the pressure level around airbag deployable data recorder 100 meets or exceeds threshold pressure level 121. Threshold pressure level 121 may be set at any appropriate pressure level such that pressure switch 120 activates inflation device 116 when airbag deployable data recorder 100 is at a selected level under water. For example, without limitation, pressure switch 120 may be a hydrostatic switch that is configured to activate in response to pressure that corresponds to about 10 meters of water depth or any other appropriate pressure level associated with any other appropriate depth under water.

Memory device 102 may be coupled to bag 104 in any appropriate manner. For example, without limitation, memory device 102 may be wrapped inside bag 104 when bag 104 is in deflated state 115. Memory device 102, bag 104, and inflation device 116 may be combined mechanically such that memory device 102 may be inside bag 104 after bag is inflated to inflated state 118.

Bag 104 may be any appropriate shape 122 when inflated 118. For example, without limitation, appropriate shape 122 of bag 104 may be spherical or oval when bag 104 is inflated 118.

The entire assembly may be contained in housing 124. For example, housing 124 may be formed in a conventional fairing 126, panel 128, or other appropriate structure on aircraft 112. In one example, without limitation, housing 124 may comprise a structure that is attached to and extends from surface 130 of aircraft 112. In this case, housing 124 may be aerodynamic 132 in shape.

In another embodiment, airbag deployable data recorder 100 may be installed in interior 133 of aircraft 112. For example, airbag deployable data recorder 100 may be installed in interior 133 of the fuselage of aircraft 112 in a number of locations where the fuselage is likely to be open after an unintended landing. For example, without limitation, airbag deployable data recorder 100 may be installed in interior 133 of aircraft 112 near doors or at other locations in interior 133 of aircraft 112 where aircraft 112 is likely to break open in the event of an unintended landing.

In any case, a portion of housing 124 may comprise cover 134. Cover 134 may be configured to be broken or otherwise to open to release bag 104 from housing 124 when bag 104 is inflated to inflated state 118.

Bag 104 may include a number of finding enhancers 136 to make bag 104 easier to find and recover when bag 104 is inflated 118 and separated from aircraft 112. For example, color 138 of bag 104 may be selected to be a high-visibility color such that bag 104 is more visible and may be more easily detected when bag 104 is floating on water. Alternatively, or in addition, bag 104 may include radar reflectors 140. Examples of radar reflectors 140 may include foil 142 and internal corner reflector 144. Other embodiments may incorporate radio frequency, RF, elements to enhance radar returns from bag 104. For example, radio frequency identification, RFID, technology wherein pulses at specific frequencies are reflected, perhaps with some modulation of the return signal, may be used as finding enhancers 136.

An active locator device, such as transmitter locator beacon 146 may also be used to help find and recover bag 104. Transmitter locator beacon 146 may be battery powered, solar powered, or utilize other energy storage techniques, such as super capacitors or chemical reactions.

The illustration of airbag deployable data recorder 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
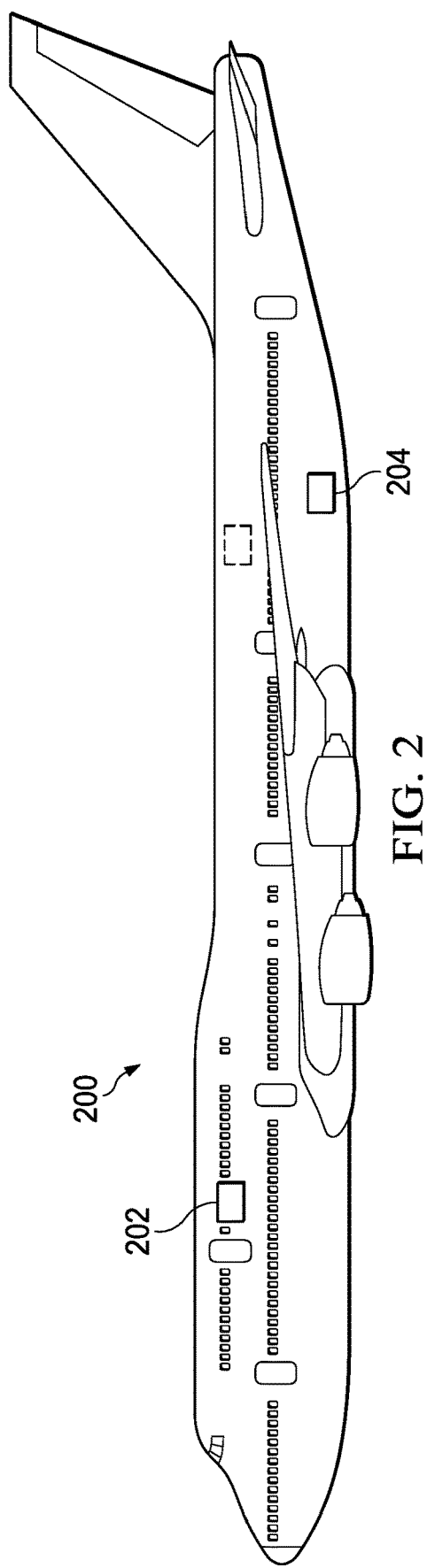
FIG. 2 is an illustration of a side view of an aircraft showing locations for airbag deployable data recorders in accordance with an illustrative embodiment.
Figure 3:
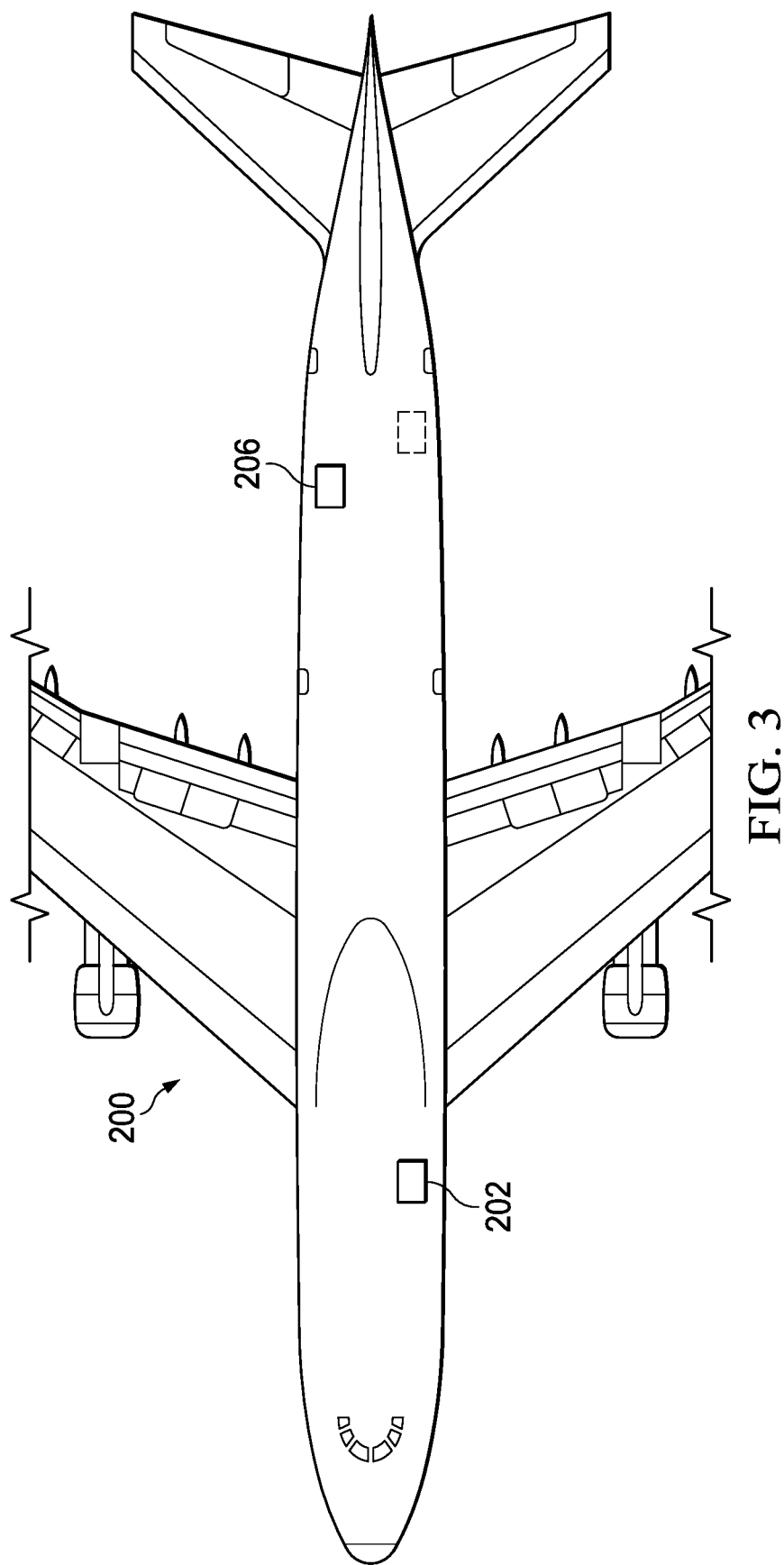
FIG. 3 is an illustration of a top plan view of an aircraft showing locations for airbag deployable data recorders in accordance with an illustrative embodiment.

Turning to FIG. 2 and FIG. 3. An illustration of a side view of an aircraft showing locations for airbag deployable data recorders is depicted in accordance with an illustrative embodiment in FIG. 2. An illustration of a top plan view of an aircraft showing locations for airbag deployable data recorders is depicted in accordance with an illustrative embodiment in FIG. 3. Aircraft 200 in FIG. 2 and FIG. 3 may be an example of one implementation of aircraft 112 in FIG. 1.

Any appropriate number of airbag deployable data recorders may be located at locations 202, 204, and 206 on aircraft 200. Airbag deployable data recorders may be located at more, fewer, and other locations on aircraft 200 than those illustrated in FIG. 2 and FIG. 3.

Figure 4:
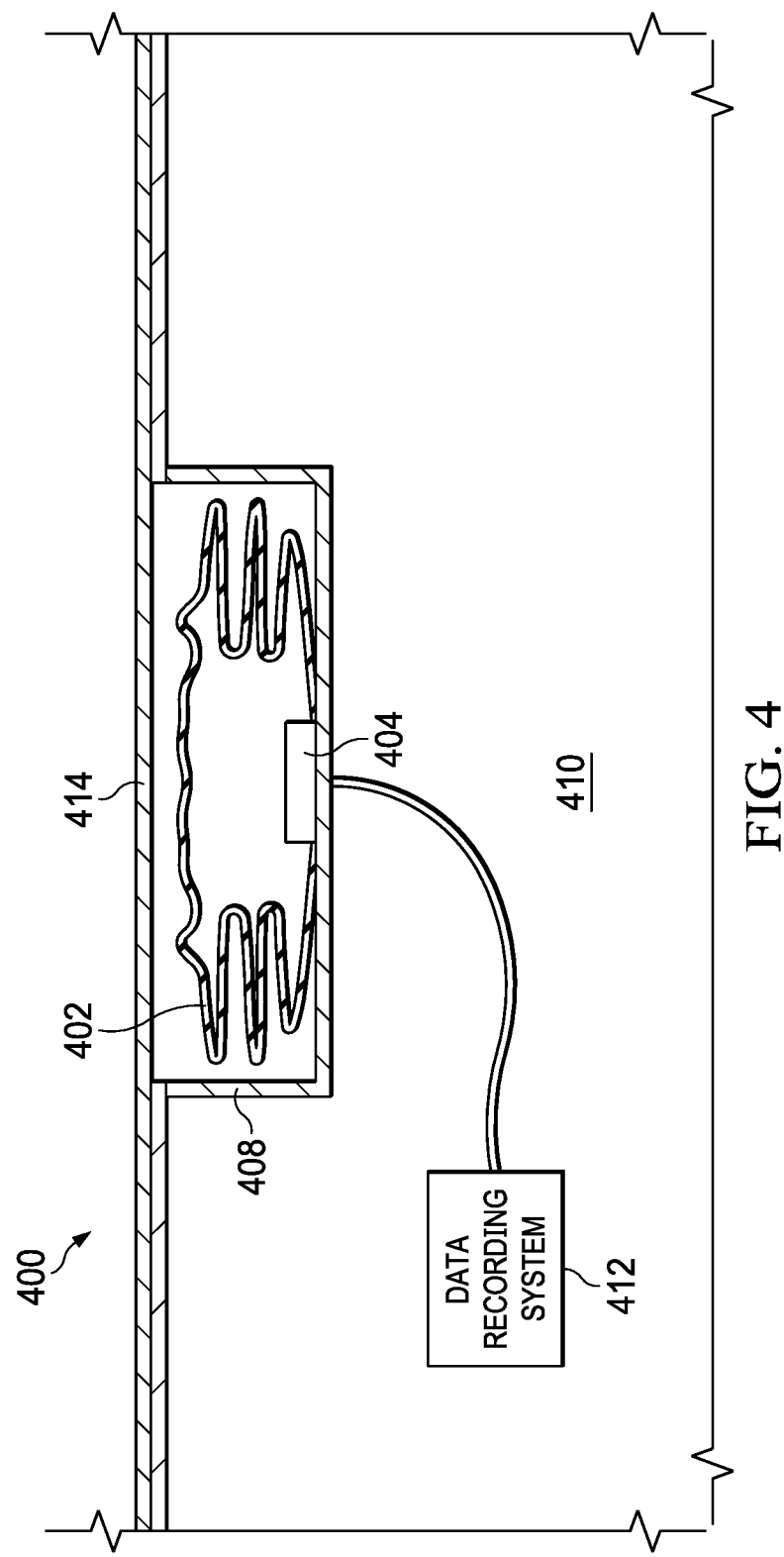
FIG. 4 is an illustrative cross-section view of an airbag deployable data recorder before deployment from an aircraft in accordance with an illustrative embodiment.

Turning to FIG. 4, an illustrative cross-section view of an airbag deployable data recorder before deployment from an aircraft is depicted in accordance with an illustrative embodiment. Airbag deployable data recorder 400 may be an example of one implementation of airbag deployable data recorder 100 in FIG. 1.

In this example, bag 402 is deflated and stored along with memory device 404 in housing 408 on aircraft 410. In this state, data recording system 412 may record fight data to memory device 404 while aircraft 410 is in flight.

Figure 5:
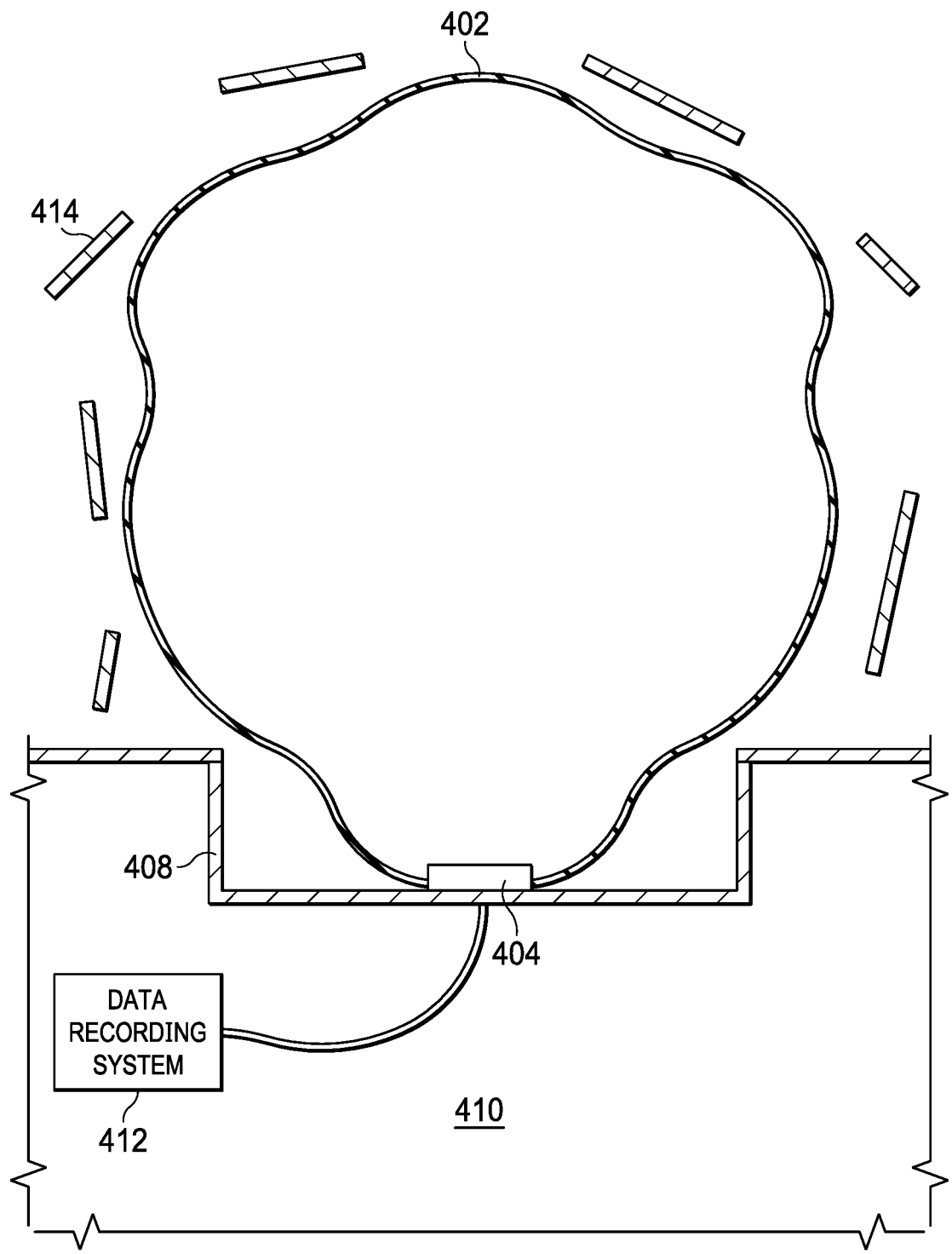
FIG. 5 is an illustrative cross-section view of an airbag deployable data recorder during deployment from an aircraft in accordance with an illustrative embodiment.

Turning to FIG. 5, an illustrative cross-section view of an airbag deployable data recorder during deployment from an aircraft is depicted in accordance with an illustrative embodiment.

In this example, an inflation device has been activated to inflate bag 402. As bag 402 inflates, cover 414 of housing 408 is broken or otherwise opened.

Figure 6:
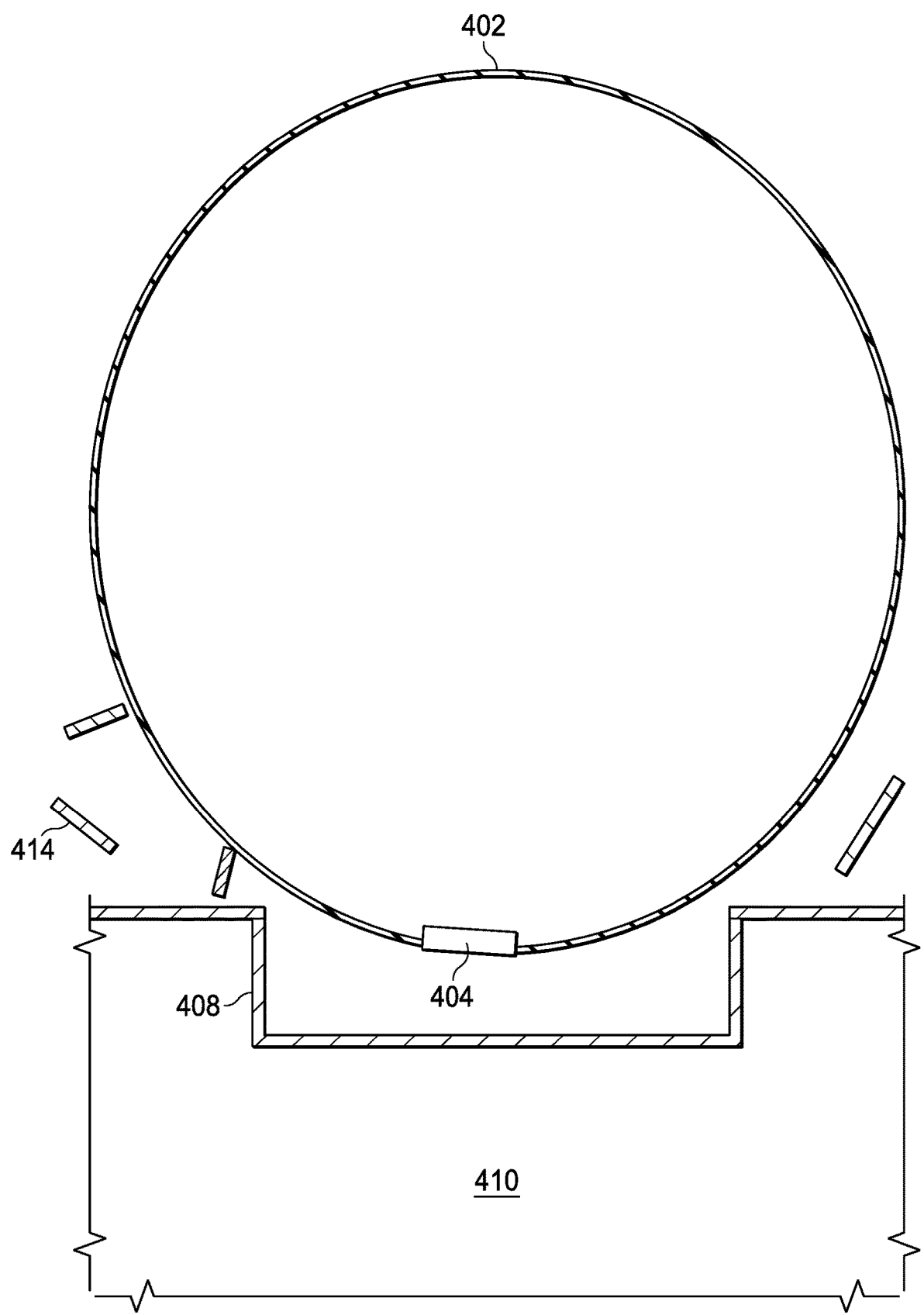
FIG. 6 is an illustrative cross-section view of an airbag deployable data recorder after deployment from an aircraft in accordance with an illustrative embodiment.

Turning to FIG. 6, an illustrative cross-section view of an airbag deployable data recorder after deployment from an aircraft is depicted in accordance with an illustrative embodiment.

In this example, bag 402 is fully inflated. Bag 402 with memory device 404 attached thereto separates from the aircraft 410.

Figure 7:
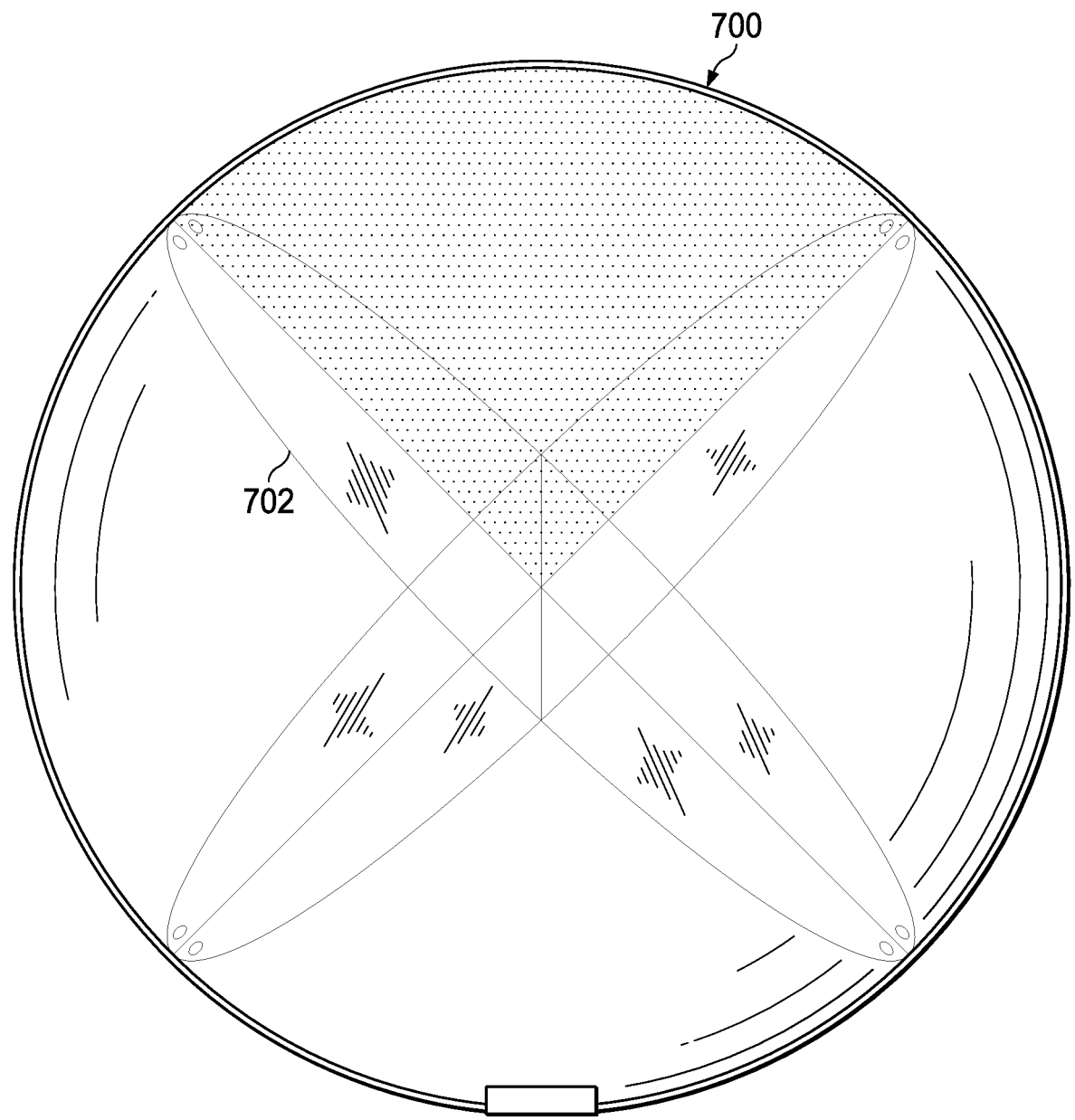
FIG. 7 is an illustration of an airbag deployable data recorder comprising an internal corner reflector in accordance with an illustrative embodiment.

Turning to FIG. 7, an illustration of an airbag deployable data recorder comprising an internal corner reflector is depicted in accordance with an illustrative embodiment. Bag 700 may be an example of one implementation of bag 104 in airbag deployable data recorder 100 in FIG. 1.

Bag 700 may include radar reflective internal corner reflector 702 that takes shape inside bag 700 when bag 700 is inflated. Radar reflective internal corner reflector 702 may be an example of one implementation of internal corner reflector 144 in bag 104 in FIG. 1.

Figure 8:
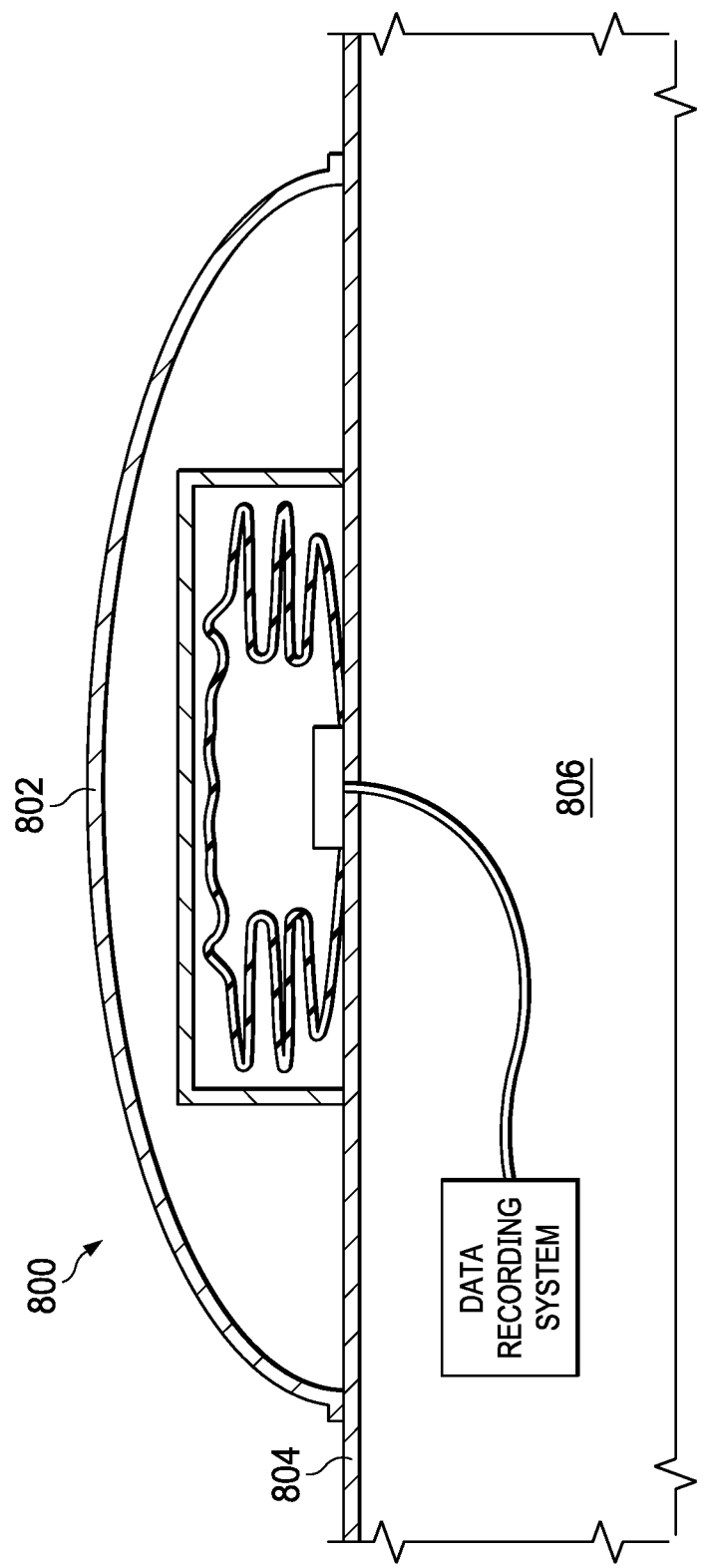
FIG. 8 is an illustrative cross-section view of an alternative embodiment of an airbag deployable data recorder before deployment from an aircraft in accordance with an illustrative embodiment.

Turning to FIG. 8, an illustrative cross-section view of an alternative embodiment of an airbag deployable data recorder before deployment from an aircraft is depicted in accordance with an illustrative embodiment. Airbag deployable data recorder 800 may be an example of one implementation of airbag deployable data recorder 100 in FIG. 1.

In this embodiment, the components of airbag deployable data recorder 800 may be contained in housing that is attached to and extends from surface 804 of aircraft 806. In this case, housing 800 is preferably aerodynamically shaped.

Figure 9:
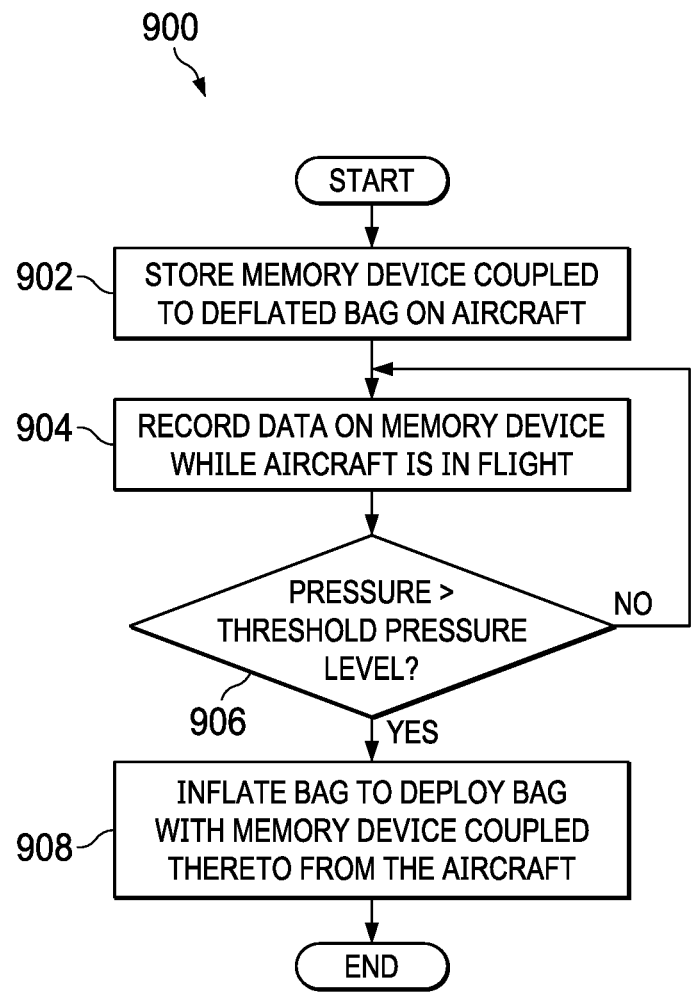
FIG. 9 is an illustration of a flow chart of a process of deploying recorded flight data from an aircraft in accordance with an illustrative embodiment.

Turning to FIG. 9, an illustration of a flow chart of a process of deploying recorded flight data from an aircraft is depicted in accordance with an illustrative embodiment. For example, process 900 may be implemented using airbag deployable data recorder 100 in FIG. 1.

Process 900 may begin with storing a memory device coupled to a bag in a deflated state on an aircraft (operation 902). Data may be recorded on the memory device while the aircraft is in flight (operation 904). It may be determined whether a pressure level is greater than a threshold pressure level (operation 906). Data may continue to be recorded on the memory device at operation 904 in response to a determination at operation 906 that the pressure level is not greater than the threshold pressure level. In response to a determination at operation 906 that the pressure level is greater than the threshold pressure level, the bag may be inflated to deploy the bag with the memory device coupled thereto from the aircraft (operation 908), with the process terminating thereafter.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a bag that is configured to be inflated from a deflated state to an inflated state;
a memory device coupled to the bag and configured to have flight data from an aircraft stored thereon, wherein the memory device is detachably coupled to a surface of the aircraft and receives power and flight data from a data recording system in the aircraft via a power line inside the aircraft until the memory device is uncoupled from the surface of the aircraft;
an inflation device configured to inflate the bag from the deflated state to the inflated state; and
a pressure switch configured to activate the inflation device to inflate the bag from the deflated state to the inflated state in response to a pressure level greater than a threshold pressure level.

2. The apparatus of claim 1, wherein the bag includes a finding enhancer selected from a group of finding enhancers configured to improve finding of the bag when the bag is in the inflated state and deployed from the aircraft, the group of finding enhancers comprising:
a radar reflector selected from a group of radar reflectors comprising radar reflective foil and an internal corner reflector;
high-visibility coloring; and
a transmitter locator beacon.

3. The apparatus of claim 1, wherein the apparatus is installed at a location on an interior of the aircraft from which the bag with the memory device coupled thereto is configured to be ejected from the aircraft in response to an unintended landing of the aircraft in water.

4. The apparatus of claim 1, wherein the bag in the deflated state is stored in a housing on the aircraft.

5. The apparatus of claim 4, wherein the housing is located in a fairing or a panel on an outside surface of the aircraft.

6. The apparatus of claim 4, wherein the housing extends outwardly from an outside surface of the aircraft and is aerodynamic.

7. The apparatus of claim 4, wherein the housing comprises a cover and wherein the cover is configured to open to release the bag from the housing in response to the bag inflating.

8. The apparatus of claim 1 further comprising a data recording system configured to receive the flight data from systems on the aircraft while the aircraft is in flight and to send the flight data to the memory device to store the flight data on the memory device.

9. The apparatus of claim 8, wherein the power line is configured to provide power to the memory device.

10. A flight data deployment system, comprising:
a plurality of airbag deployable data recorder systems on an aircraft, wherein each of the plurality of airbag deployable data recorder systems is located at a different location on the aircraft, and wherein each of the plurality of airbag deployable data recorder systems comprises:
a bag that is configured to be inflated from a deflated state to an inflated state, wherein the bag includes a finding enhancer configured to improve finding of the bag when the bag is in the inflated state and deployed from the aircraft;
a memory device coupled to the bag and configured to have the flight data from the aircraft stored thereon, wherein the memory device is detachably coupled to a surface of the aircraft and receives power and flight data from a data recording system in the aircraft via a power line inside the aircraft until the memory device is uncoupled from the surface of the aircraft;
an inflation device configured to inflate the bag from the deflated state to the inflated state; and
a pressure switch configured to activate the inflation device to inflate the bag from the deflated state to the inflated state in response to a pressure level greater than a threshold pressure level.

11. The system of claim 10, wherein the finding enhancer is selected from a group of finding enhancers consisting of:
a radar reflector selected from a group of radar reflectors consisting of radar reflective foil and an internal corner reflector;
high-visibility coloring; and
a transmitter locator beacon.

12. A method of deploying flight data from an aircraft, comprising:

storing a bag in a deflated state on the aircraft;

storing the flight data on a memory device coupled to the bag, wherein the memory device is detachably coupled to a surface of the aircraft and receives power and flight data from a data recording system in the aircraft via a power line inside the aircraft until the memory device is uncoupled from the surface of the aircraft; and inflating the bag from the deflated state to an inflated state in response to a pressure level greater than a threshold pressure level to deploy the bag with the memory device coupled thereto from the aircraft.

13. The method of claim 12, wherein storing the bag in the deflated state on the aircraft comprises installing the bag at a location on an interior of the aircraft from which the bag with the memory device coupled thereto is configured to be ejected from the aircraft in response to an unintended landing of the aircraft in water.

14. The method of claim 12, wherein the bag includes a finding enhancer selected from a group of finding enhancers configured to improve finding of the bag when the bag is in the inflated state and deployed from the aircraft, the group of finding enhancers comprising:

a radar reflector selected from a group of radar reflectors comprising radar reflective foil and an internal corner reflector;

high-visibility coloring; and a transmitter locator beacon.

15. The method of claim 12, wherein storing the bag in the deflated state on the aircraft comprises storing the bag in the deflated state in a housing on the aircraft.

16. The method of claim 15, wherein the housing is located in a fairing or a panel on an outside surface of the aircraft.

17. The method of claim 15, wherein the housing extends outwardly from an outside surface of the aircraft and is aerodynamic.

18. The method of claim 15, wherein:

the housing comprises a cover; and inflating the bag from the deflated state to the inflated state opens the cover to release the bag from the housing.

19. The method of claim 12, wherein storing the flight data on the memory device comprises:

receiving the flight data from systems on the aircraft while the aircraft is in flight; and sending the flight data to the memory device to store the flight data on the memory device.

20. The method of claim 19, wherein the power line is configured to provide power to the memory device.

* * * * *